United States Patent Office 3,473,819
Patented Oct. 21, 1969

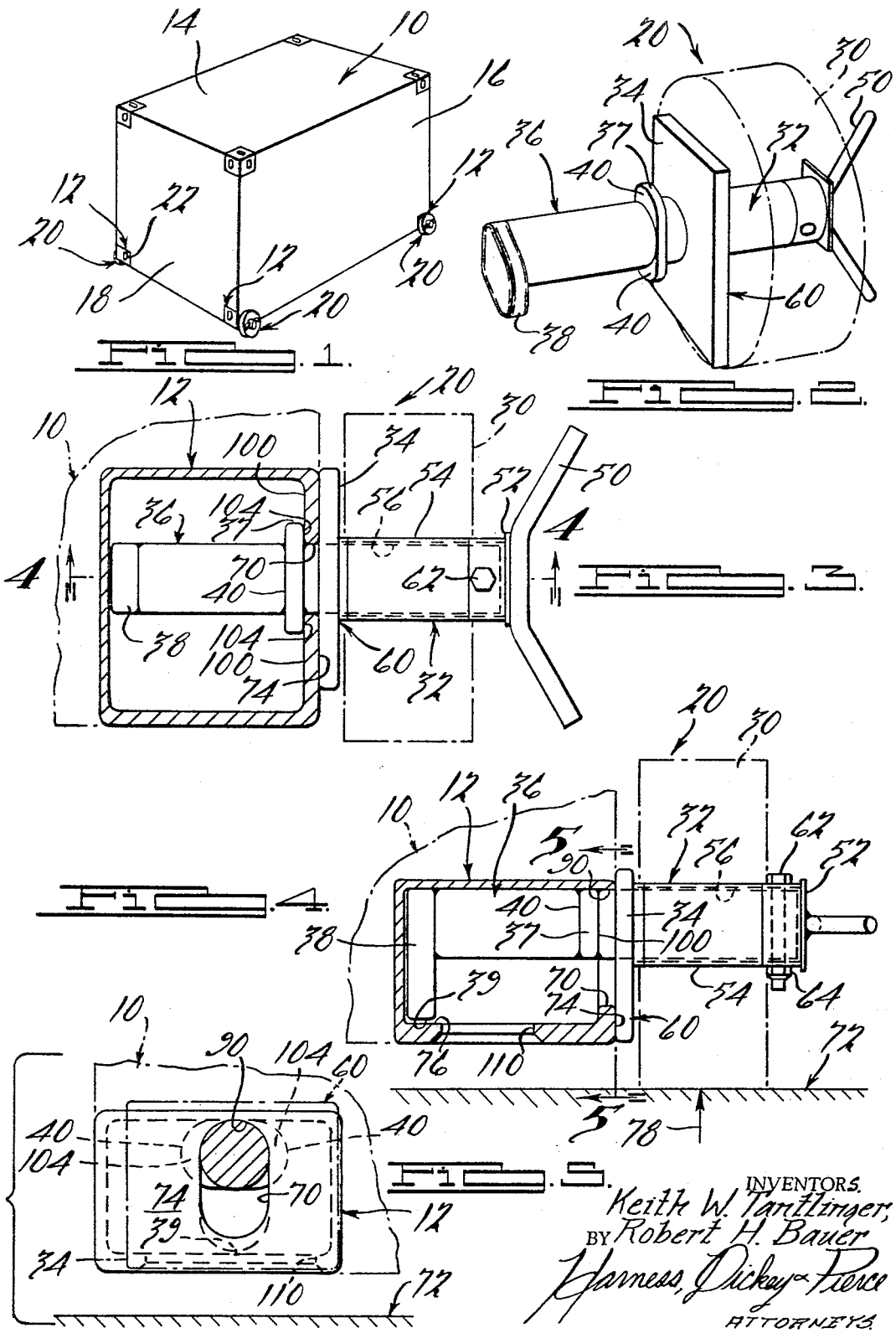

3,473,819
PLUG-IN WHEEL
Keith W. Tantlinger, Grosse Pointe, and Robert H. Bauer, Farmington, Mich., assignors to Fruehauf Corporation, a corporation of Michigan
Filed July 20, 1967, Ser. No. 654,814
Int. Cl. B62b 11/00
U.S. Cl. 280—47.32  3 Claims

ABSTRACT OF THE DISCLOSURE

A plug-in wheel and container assembly for use in facilitating the movement of the container from place to place, said assembly comprising in combination a wheel and axle having an extended plug-in member which cooperates with one or more slotted receptacles on the container such that the plug-in wheel can be engaged with the container and then rotated into a locked position to thereby enable the container to be rolled about on wheels. The extended plug-in member is uniquely designed such that when it is rotated into locking engagement with the receptacle, the loading or contact areas as between the member and the receptacle provide the plug-in wheel with a firm and stationary support to hold the wheel in position due to the weight of the container pushing downwardly against the upward force of the wheel which rests on a support surface.

BACKGROUND OF THE INVENTION

This invention broadly relates to a plug-in wheel and container assembly for use in providing containers or the like with mobility. More particularly, the invention relates to a plug-in wheel and container assembly wherein a specially designed wheel, having an extended plug-in member attached to the wheel axle, can be inserted into a slotted receptacle at one or more points about the bottom of a container to thereby provide the container with a means of rolling from place to place.

Large containers, for example, the type used in the piggy-back transportation of material on railway flat cars normally require large and expensive equipment in order to move the containers about, as well as requiring considerable manpower to operate the equipment and move the containers. There has long been a need in this area concerning the movement of large containers for a means of facilitating container movement at least where the distance the container is to be moved is relatively short and does not require complicated maneuvering of the container.

Accordingly it is an object of this invention to provide an improved plug-in wheel and container assembly which greatly facilitates the movement of containers from place to place and yet does not require the utilization of large and expensive equipment.

Another object of the present invention is to provide a plug-in wheel and container assembly wherein, when the wheel is in engagement with the container, loading or contact areas are formed between the wheel and the container to provide a unique and stationary support for the wheel which thereby enables rapid and easy rolling movement of the container.

Other objects, features and advantages of the present invention will become apparent from the subsequent description and the appended claims taken in conjunction with the accompanying drawings.

BRIEF DESCRIPTION OF THE DRAWINGS

FIGURE 1 illustrates a general view of a container with plug-in wheels in engaged position at each of the bottom four corners of the container to enable rolling movement thereof;

FIGURE 2 illustrates the plug-in wheel device of this invention partly in phantom;

FIGURE 3 illustrates a cross-sectional top view of the plug-in wheel of FIGURE 2 positioned in engagement with a typical slotted receptacle as shown at the bottom of the corners of the container in FIGURE 1;

FIGURE 4 illustrates an elevational cross-section view taken along the line 4—4 of FIGURE 3; and FIGURE 5 illustrates a view taken along the line 5—5 of FIGURE 4.

SUMMARY OF THE INVENTION

Broadly stated, the invention is comprised of a plug-in wheel device comprising: a wheel, an axle member, first means extending from one end of said axle member for fixing said device in engagement with a slotted receptacle on a container, said means including at least two contact portions which effectively hold the device in stationary position due to an upward force created against the axle from supporting the container, second means at the other end of said axle member for effecting said engagement of the device; and the combination of at least one or more of said devices with a container assembly.

DESCRIPTION OF PREFERRED EMBODIMENTS

FIGURE 1 shows a container generally designated 10 of rectangular box-like shape. The container 10 has corner castings designated 12 disposed at each of the bottom four corners of the container. The container itself may have a top 14; and side walls 16 and end walls 18 may be either permanent in nature or have doors or other forms of openings disposed therein. Three plug-in wheels designated 20 are visible in engaged position at the lower corners of the container 10 in FIGURE 1. These plug-in wheels 20 are engaged with the casting 12 of the container 10 by first inserting the plug-in wheels 20 into the slots generally indicated 22 on the face of the casting 12 and then rotating the plug-in wheel into an engaged position as will be described more fully herein below.

FIGURES 2, 3, and 4 show in more detail the plug-in wheel device 20, and the manner of utilizing the plug-in wheel in engaged position with the castings 12.

The plug-in wheel device is comprised of wheel 30, axle member 32, rectangular flange member 34, and an extended plug-in member designated 36 including the collar flange 37 and a shoe-like flange 38 disposed at an angle offset by approximately 90° relative to the protruding members 40 of the collar flange 37.

The plug-in wheel 20 also includes a manual turn handle or bar 50 at the opposite end of the axle 32 relative to the extended plug-in member 36. The handle 50 is fixedly attached to an end cap or plate 52 by welding or the like, and the end plate 52 is in turn attached to the cylindrical member 54 which fits over the rod 56 and the cylindrical member 54 extends to and comes in general contact with the flange member 34 at the point designated 60. The cylindrical member 54 is immovable relative to the rod 56 due to the bolt 62 and nut 64 which pass through the rod 56 and cylindrical member 54 to make a connection therebetween.

The corner castings 12 as shown in FIGURE 1 are illustrated in more detail by FIGURES 3-5. The casting 12 forms a slotted receptacle for the extended plug-in member 36. The slot 70 in the casting 12 is generally positioned in the side of the casting in perpendicular relationship to a support surface or ground level 72 on which the wheel 30 is in rolling contact.

The operation or usage of the plug-in wheel device 20 is as follows. In order to insert the plug-in wheel device 20 into the slotted receptacle formed by the casting 12 and the slot 70, the shoe-like flange 38 is aligned in oblong position with the slot 70 such that the shoe-like flange can be inserted through the slot 70 at a slightly angled position and then inserted the rest of the way into the casting 12 until contact is made between the outer surface 74 of the casting 12 and the collar flange member 37. In order to insert the collar flange 37 through the slot 70 the plug-in wheel device is rotated 90° by the use of the handle 50 such that the original angular alignment of the device used to insert the shoe-like flange 37 through the slot 70 is now offset by 90° in order that the collar flange 37 lines up with the slot and then can be readily passed therethrough. At this point the rectangular flange 34 is in general loose fitting contact with the outer wall or surface 74 of the casting 12. Then in order to bring plug-in wheel device 20 into final engaged position the handle 50 is rotated backwards 90° from the position used to insert the collar flange 37 through the slot 70 to thereby bring the shoe-like flange 38 into a perpendicular position relative to the bottom inner wall surface 76 as most clearly shown in FIGURE 4. When in this position as shown in FIGURE 4 the plug-in wheel device 20 is ready for operation to facilitate the rolling movement of the container 10. Of course, any and all of the above operations are carried out by first lifting the container during the insertion of the plug-in wheel device, and this lifting may be carried out in any conventional manner, for example manually, with a crowbar, or with other suitable lifting equipment.

Once the plug-in wheel device 20 is in final inserted and engaged position as most clearly shown in FIGURES 4 and 5, the relationship of the loading or contact areas which support the axle 32 for rotational movement of the wheel 30 is as follows. The upward force against the wheel as shown by the arrow designated 78 results from the downward weight of the container 10 pushing the wheel against the support surface or ground 72. This upward force 78 against the wheel 30 in effect causes the rod 56 to generally pivot slightly about the contact area 90 to thereby bring the tip 39 of the shoe-like flange 38 into contact with the bottom inner surface 76 of the casting 12. This loading or contact portion at tip 39 touching the surface 76 acts to hold the rod 56 in fixed position and prevented from further pivoting about the contact area 90 to thereby provide the axle 32 with a firm and stationary position to enable the wheel 30 to freely rotate thereabout.

The upward force 78 against the wheel 30 in addition to causing the loading or contact portion at tip 39, furthermore, results in a second loading area or contact portion about the collar flange member 37. This contact area about the collar flange member 37 is explained as follows. First the rod 56 adjacent the collar flange member 37 contacts the interior upper wall of the receptacle formed within the casting 12 at the position designated 90. In addition due to the slight rotation or cantilevering of the rod 56 due to the upward force 78 on the wheel 30, the collar flange member 37 has its flange members 40 pinched against the interior wall 100 of the casting 12 such that general contact is made with the collar member 37 on the surface designated 104 and best shown in FIGURES 3 and 5.

Opening 110 shown in FIGURES 4 and 5 may be used for connection with lockdown abutments on any particular surface supporting the containers, for example in transportation on a railway flatcar.

What is claimed is:
1. A plug-in wheel and container assembly comprising:
a container, including
a plurality of slotted receptacles proximate to a bottom surface of the container, and at least one
plug-in wheel device engaged with one of said receptacles, and comprising:
a wheel,
an axle member,
first means extending from one end of said axle member for fixing said device in engagement with the slotted receptacle on the container,
said means including at least two contact portions which effectively hold the device in stationary position due to an upward force created against the axle from supporting the container,
second means at the other end of said axle member for effecting said engagement of the device,
said plug-in wheel device being operatively engageable with said container assembly for rotating said second means less than one full rotation thereof,
said at least two contact portions being brought into operative engagement to hold the device in position by said rotating,
said first means further including
at least two angularly offset flange means for substantially effecting the supporting of the container,
said at least two flange means both passing through a particular slot of said slotted receptacle in order to engage the device with the receptacle through angular rotation of the offset flange means.

2. The assembly of claim 1 wherein said at least two flange means form at least two loading contact areas which operate to hold said axle in generally horizontal position.

3. A plug-in wheel device comprising:
a wheel,
an axle member,
first means extending from one end of said axle member for fixing said device in engagement with a slotted receptacle on a container,
said means including at least two contact portions which effectively hold the device in stationary generally horizontal portion due to an upward force created against the axle from supporting the container,
second means at the other end of said axle member for effecting said engagement of the device,
said first means being operative for fixing in engagement by insertion into the slotted receptacle and rotated therein, and
said first means further including two flange members offset approximately 90° relative to one another and adapted to provide said engagement when rotated approximately 90°.

References Cited
UNITED STATES PATENTS

| 1,468,768 | 9/1923 | Yogel et al. | 301—132 |
| 2,733,076 | 1/1956 | Burnett | 280—47.32 |
| 3,135,560 | 6/1964 | Carlson | 301—131 |
| 3,195,919 | 7/1965 | Lossman | 280—47.32 |

LEO FRIAGLIA, Primary Examiner

JOHN A. PEKAR, Assistant Examiner

U.S. Cl. X.R.

301—132